Feb. 3, 1953     S. D. RUSSELL     2,627,159
PICKUP CONSTRUCTION
Filed March 4, 1946     2 SHEETS—SHEET 2

Stanley D. Russell
INVENTOR.

BY
ATTORNEY.

Patented Feb. 3, 1953

2,627,159

UNITED STATES PATENT OFFICE 2,627,159

PICKUP CONSTRUCTION

Stanley D. Russell, Racine, Wis., assignor to J. I. Case Company, Racine, Wis., a company of Wisconsin Application March 4, 1946, Serial No. 651,854

10 Claims. (Cl. 56—364)

This invention relates to a pick-up construction for balers, harvesters and the like, adapted to pick-up a cut forage crop such as hay or grain from the ground and to deliver it to an apron or other feeder for the machine.

Pick-ups have generally been constructed of the rotary drum type with radial teeth extending outwardly from the drum at circumferential and longitudinally spaced intervals on the drum. Some have employed teeth mounted on separate adjacent chains or on chain driven slats.

One of the objects of the present invention is to provide a simpler and less costly pick-up construction which substantially reduces repair and maintenance costs.

Another object of the invention is to provide a pick-up that operates more smoothly and quietly.

Another object is to provide a pick-up that is more durable and less apt to break by encounter of obstructions and the like and which automatically slips when needed, to protect the teeth and mechanism from injury.

Another object is to provide a simple and effective mounting for the pick-up teeth.

Another object is to provide a more flexible drive for the pick-up teeth.

Another object is to lengthen the raking operation of the pick-up.

Another object is to provide a more effective stripper mounting for the pick-up.

Another object is to provide a pick-up which is spring mounted to automatically adjust itself to the uneven terrain over which it passes.

Other objects and advantages of the invention appear hereinafter, in the description of an embodiment of the invention illustrated in the accompanying drawings.

In the drawings:

Fig. 4 is a detail enlarged section through a belt showing a tooth mounting thereon and a sheave mounting for the belt.

Figure 1:
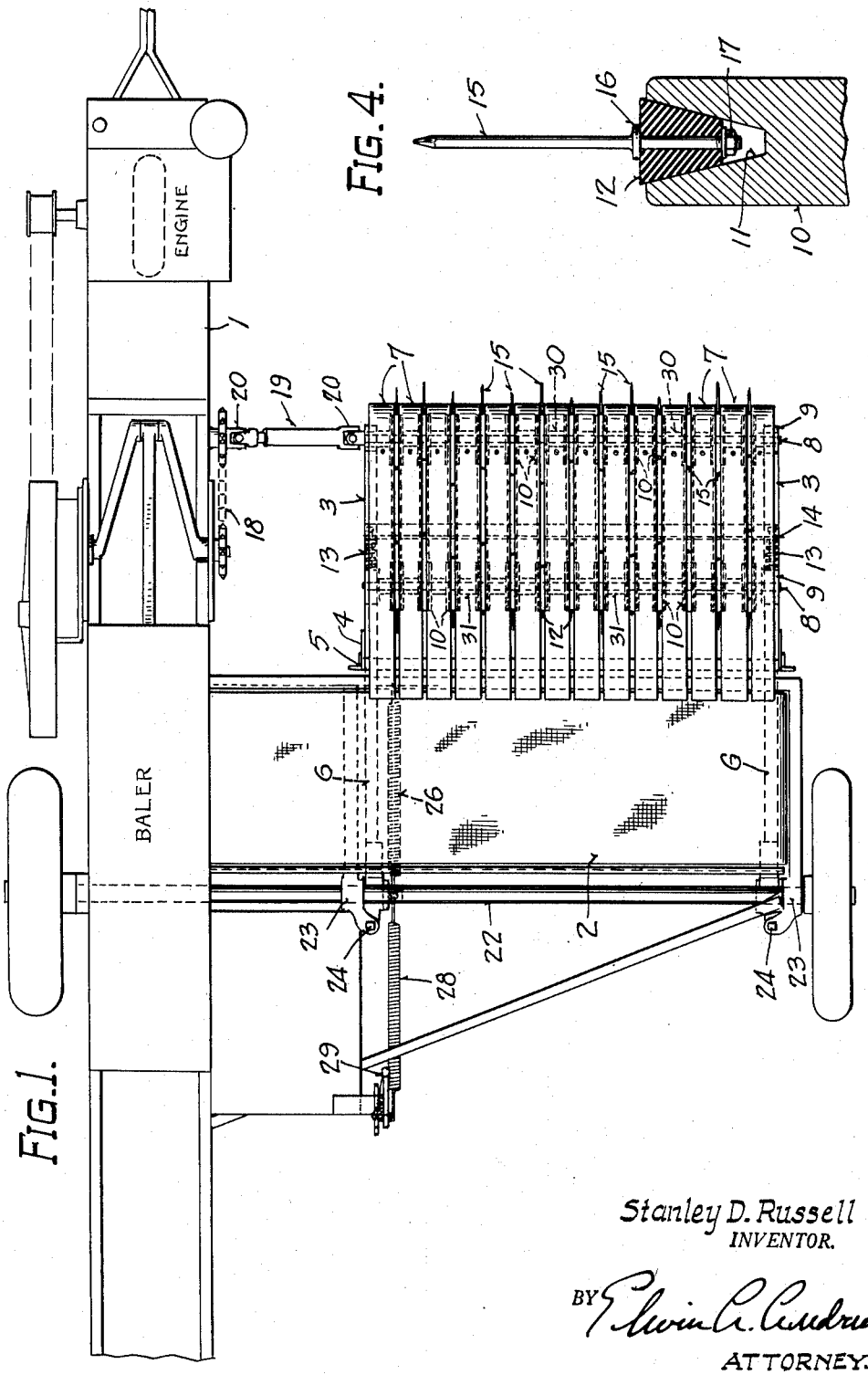
Figure 1 is a top plan view of the pick-up and schematically shows a baler or harvester to which it is attached.
Figure 2:
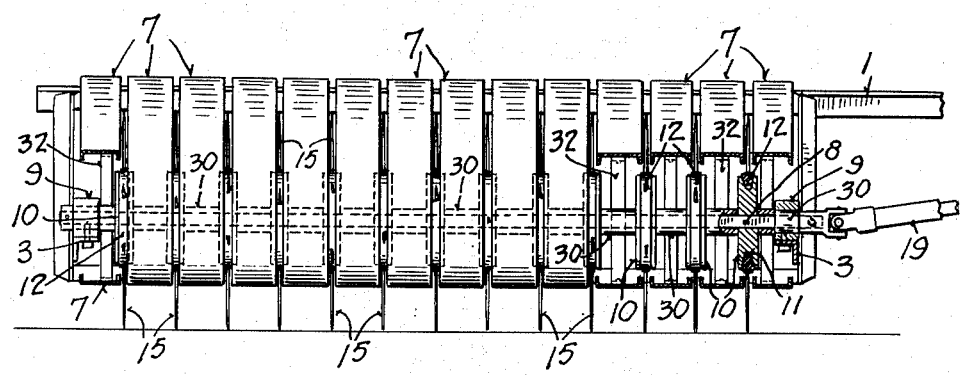
Fig. 2 is a front elevation of the pick-up enlarged from that shown in Fig. 1 and with parts broken away and sectioned.
Figure 3:
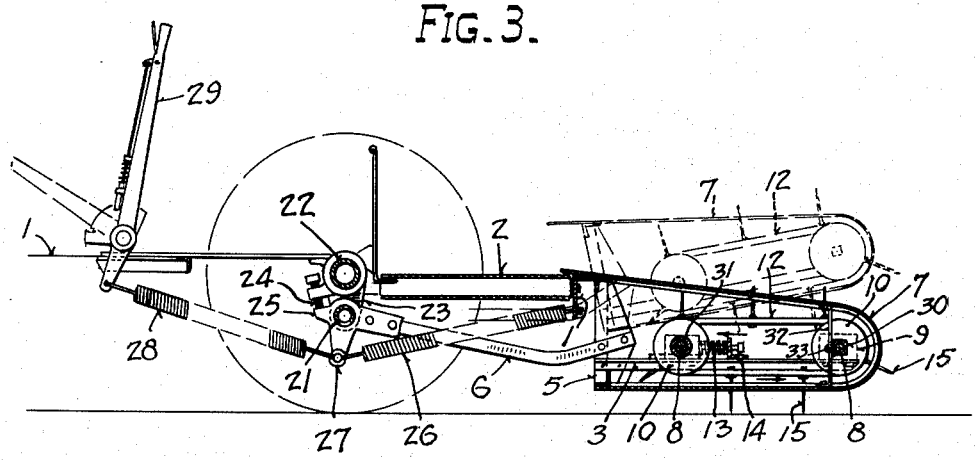
Fig. 3 is a side elevation of the pick-up with parts broken away and sectioned.

The pick-up is shown attached to one side of a mobile baler, chopper, drier, harvester or other crop treating device 1 and is adapted to pick-up a forage crop or the like from the ground as the device 1 moves forwardly and to deliver the crop material upon a feeder apron 2 for the device.

The frame for the pick-up comprises a pair of parallel forwardly extending side bars 3 secured at their rear ends to the corresponding end flanges 4 of a vertical plate-like cross member 5. The frame is supported rigidly upon the outer forward ends of a pair of vertically pivotal lever arms 6.

The housing for the pick-up comprises a plurality of laterally spaced bars 7 extending horizontally forward from the lower edge of cross member 5 and looped upwardly around the pickup rotor and rearwardly along a gradual upward incline to the upper edge of cross member 5. The bars 7 are preferably of flat strip metal flanged inwardly along the sides like a shallow channel to provide rigidity for the pick-up housing.

The rotor for the pick-up is disposed within housing 7 and comprises a pair of parallel transverse shafts 8 mounted for rotation in end bearings 9 carried by the side bars 3. Each shaft 8 has a plurality of adjacent sheaves 10 thereon with V-grooves 11 in their peripheries for receiving and holding corresponding V-belts 12.

The sheaves 10 of one shaft 8 are aligned with the corresponding sheaves 10 of the other shaft 8 so that each V-belt 12 runs on a pair of aligned sheaves, there being as many V-belts as there are sheaves on a given shaft.

The belts 12 are maintained under a predetermined tension by mounting bearings 9 for the idling shaft 8, preferably the rear shaft, in a slideway on the side bars 3 and providing a spring 13 between an abutment 14 and the bearing housing on each corresponding frame.

Each V-belt 12 has a plurality of spaced spike-like pick-up teeth 15 extending outwardly therefrom. The teeth 15 preferably have their outer ends pointed and each tooth has a central shoulder 16 for engaging the outer surface of the corresponding belt 12 when the inner end of the tooth is passed through the belt. The inner end of each tooth 15 is threaded, and a nut 17 screwed thereon secures the tooth to the belt.

The teeth 15 extend outwardly through the spaces between bars 7 to constitute the pick-up teeth for the crop material. In practice it has been found suitable to construct the bars 7 of strips about three inches wide and to space them apart about one-half an inch, the teeth 15 extending through the spaces thus provided. The belts 12 are therefore spaced a little over three inches apart on centers.

The number of teeth 15 on each belt 12 may vary and will depend largely upon the length of the belt. In general the teeth may be spaced from four to six inches apart longitudinally of the belt depending upon the length of the horizontal path of the belt, determined by the spacing of the shafts 8 and size of the sheaves 10. Each belt 12 should have at least one tooth 15 projecting downwardly to engage the ground at any given time in the operation of the pick-up.

The belts 12 are driven in the direction of the arrows in the drawing to provide a forward raking movement for the teeth 15 as the pick-up moves forwardly over the ground, and a lifting movement for the hay as the teeth 15 rise in front on the forward sheaves 10.

The bars 7 constitute stripper plates for gradually lifting the crop material off from the teeth 15 as the material is pushed rearwardly up the inclined top of the bars 7, and the teeth 15 simulate a receding movement through the spaces between the bars as they move rearwardly. The crop material is then picked up by feed apron 2 and fed to the treating device 1.

The driving of belts 12 is accomplished by driving the forward shaft 8 with its sheaves 10 in the direction desired, opposite to the direction of movement over the ground. This may be accomplished by a chain 18 driven from the device 1 and driving a shaft 19 extending laterally from the power drive for the device 1 in general alignment with shaft 8 to be driven. A universal coupling 20 is disposed in shaft 19 to allow the pick-up to float over rough terrain.

The vertical floating of the pick-up is accomplished by securing the rear ends of lever arms 6 to a pivot shaft 21 which is suspended beneath the rear axle 22 of the device 1 in bearings in suitable brackets 23. An adjustable stop 24, on one of the brackets 23 is engaged by a shoulder 25 on one of the arms 6 to limit the downward pivoting of the pick-up below the desired horizontal operating position.

The pick-up is adapted to be raised upwardly clear of the ground when not in use, to prevent possible injury to the pick-up when the device 1 is being transported from job to job. For this purpose a tension spring 26 is secured at one end to a crank arm 27 on the inner end of shaft 21. The spring 26 is secured at its other end to the frame of the device 1 at a substantial distance from the pivotal shaft. Preferably, arm 27 extends downwardly from shaft 21, and spring 26 extends forwardly from the arm 27 to effect lifting of arms 6 by the tension of the spring. Spring 26 should be sufficiently strong to lift the pick-up and retain the same in its inoperative position spaced above the ground.

When it is desired to lower the pick-up to operative position a second tension spring 28 secured to crank arm 27 and extending rearwardly to the manual operating lever 29, is tensioned by lever 29 to effect pivoting of shaft 21 and arms 6 to a point where shoulder 25 engages or nearly engages stop 24.

The springs 26 and 28 are opposed to each other when lever 29 is moved to operative position for the pick-up by the tensioning of spring 28. In this position the weight of the rotor is substantially balanced by the differential tensioning of springs 26 and 28 so that the rotor floats lightly on the ground and is enabled to move over rough places without injury to the teeth 15 or belts 12.

When lever 29 is moved to release the tension on spring 28, the spring 26 lifts the rotor upwardly to inoperative position.

The flexible V-belts 12 are free to give individually when uneven ground is encountered, and may recede by shortening the distance between shafts 8 against the spreading action of springs 13. The belts 12 may slip relative to the sheaves 10 and to each other in case the teeth 15 strike obstructions, and injury to the teeth and mechanism is thereby avoided.

The sheaves 10 may be mounted on the shafts 8 in any suitable manner. The forward drive shaft 8 may be square or polygonal in shape and the sheaves 10 thereon may have cored square holes to fit the same. The shaft 8 has spacer sleeves 30 between the sheaves 10 to space the latter thereon. The end sleeves 30 are cylindrical on the outside and extend into the bearings 9 to support the shaft for rotation.

The rear idling shaft 8 may be circular in cross section and have circular tubular sleeves 31 mounted thereon for spacing the sheaves 10 on the shaft.

The upper rear ends of bars 7 are adapted to overlie the forward edge of apron 2 when the pick-up is in operation to facilitate delivery of the crop material to the apron.

The bars 7 constituting the pick-up housing are preferably constructed of highly resilient metal to prevent easy denting of the same by the encounter of stones and the like. The bars 7 may be braced against displacement near the curved forward ends by means of short channel strips 32 extending between the upper and lower sections of the respective bars and secured thereto. The bracing strips 32 extend between the adjacent V-belts 12 and may have a central bearing member 33 partially journaled on a corresponding sleeve 31 on the forward shaft 8.

The invention may have various embodiments within the scope of the claims.

I claim:

1. A mobile pick-up unit for picking up and elevating loose material of the class described from the ground, comprising a frame, means for moving said frame forwardly along the ground, a forward set of sheaves carried by said frame and having a common axis transverse to the direction of movement of said frame, a rear set of sheaves carried by said frame and having a common axis transverse to the direction of movement of said frame, said sets of sheaves being spaced apart longitudinally of said frame and having the corresponding sheaves thereof in alignment, a plurality of endless belts having a lower and an upper run and mounted on the corresponding sheaves of said sets, said belts extending longitudinally of said frame substantially in the line of travel thereof, the upper run of said belts extending to a zone of delivery of material, a series of spaced pick-up teeth carried by each belt and adapted to rake the ground and to pick-up material therefrom, and means operatively associated with at least one of said sets of sheaves and driving said lower belt run in a forward direction and driving said upper belt run in a rearward direction to effect delivery of material, the upward movement of the belts around the forward sheaves effecting pick-up of raked material from the ground by said teeth.

2. The mobile pick-up unit of claim 1 in which the means for moving the frame forwardly along the ground comprises means operatively associated with said frame to support the same in either of two positions, the frame in one position being raised to a travel position where the pick-up is inoperative, and the frame in the other position being biased toward the ground to effect the stated raking and pick-up operations.

3. The mobile pick-up unit of claim 1 in which the means for moving the frame forwardly along the ground comprises means associated with said frame and biasing the same upwardly to an inoperative position, and manually operable means associated with said last named means to oppose the same and secure the frame in operative position.

4. The mobile pick-up unit of claim 1 in which the means for moving the frame forwardly along the ground comprises a pivotal support for the frame disposed on a transverse axis rearwardly thereof, and means associated with said pivotal support to lift the frame thereon to an inoperative position and to lower the frame to operative position.

5. The combination with the pick-up unit of claim 1 of a plurality of stripper bars carried by the frame above the belts, said stripper bars being disposed between the teeth of adjacent belts and being inclined upwardly and rearwardly relative to the upper belt run to elevate the material gradually to a level above the tips of the teeth.

6. The combination with the pick-up unit of claim 1 of a housing for the belts comprising a plurality of laterally spaced parallel bars carried by the frame and looped forwardly about the forward end of the belts, said bars having a lower section disposed generally horizontal beneath the lower belt run and having an upper section inclined upwardly and rearwardly relative to the upper belt run and above the latter and said bars being disposed between the teeth of corresponding adjacent belts.

7. The mobile pick-up unit of claim 1 comprising additional means carried by the frame and associated with said sheaves to bias the sheaves of one set away from the sheaves of the other set, said biasing means being adapted to yield under temporary increased tensioning of said belts in operation.

8. The mobile pick-up unit of claim 1 in which said belts are individual endless V-belts and said sheaves have V-grooves therein gripping the sides of the corresponding belts and retaining the belts against lateral force from the teeth.

9. The mobile pick-up unit of claim 1 in which said belts are individual endless V-belts, said teeth are rigidly secured to said belts and extend outwardly from the corresponding belts and generally normal to the outer surface thereof.

10. The mobile pick-up unit of claim 1 in which said belts are individual endless V-belts, said teeth comprise spikes extending outwardly from the corresponding belts generally normal thereto and have shanks extending through the corresponding belts and secured on the inner side thereof, and said sheaves have V-grooves therein gripping the sides of the corresponding belts and providing space beneath the belts for receiving the inner ends of the teeth shanks.

STANLEY D. RUSSELL.

REFERENCES CITED

The following references are of record in the file of this patent:

UNITED STATES PATENTS

| Number | Name | Date |
|---|---|---|
| 1,474,585 | Fritschi et al. | Nov. 20, 1923 |
| 1,619,610 | Fritz | Mar. 1, 1927 |
| 1,780,472 | Gilger | Nov. 4, 1930 |
| 2,141,493 | Tallman | Dec. 27, 1938 |
| 2,242,077 | Jones | May 13, 1941 |
| 2,297,295 | Flintjer | Sept. 29, 1942 |
| 2,347,926 | Paradise et al. | May 2, 1944 |
| 2,363,888 | Martin | Nov. 28, 1944 |
| 2,489,199 | Russell | Nov. 22, 1949 |
| 2,524,233 | Russell | Oct. 3, 1950 |

FOREIGN PATENTS

| Number | Country | Date |
|---|---|---|
| 638,713 | France | Feb. 27, 1928 |
| 509,048 | Great Britain | June 27, 1939 |